(12) United States Patent
Lu et al.

(10) Patent No.: US 11,452,079 B2
(45) Date of Patent: Sep. 20, 2022

(54) METHOD FOR DETERMINING SIDELINK CATEGORY, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/090,576

(22) Filed: Nov. 5, 2020

(65) Prior Publication Data

US 2021/0058915 A1 Feb. 25, 2021

Related U.S. Application Data

(63) Continuation of application No. PCT/CN2019/093706, filed on Jun. 28, 2019.

(30) Foreign Application Priority Data

Jun. 29, 2018 (CN) .......................... 201810701635.2

(51) Int. Cl.
*H04W 4/00* (2018.01)
*H04W 72/04* (2009.01)
*H04W 92/18* (2009.01)

(52) U.S. Cl.
CPC ........ *H04W 72/0406* (2013.01); *H04W 92/18* (2013.01)

(58) Field of Classification Search
CPC ............. H04W 76/10; H04W 72/0406; H04W 72/0446; H04W 72/085; H04B 7/15
(Continued)

(56) References Cited

U.S. PATENT DOCUMENTS 10,028,235 B2 * 7/2018 Kim ..................... H04W 72/12
10,869,297 B2 * 12/2020 Seo ........................ H04W 72/02
(Continued)

FOREIGN PATENT DOCUMENTS

| CN | 106717091 A | 5/2017 |
| CN | 107371256 A | 11/2017 |

(Continued)

OTHER PUBLICATIONS

Intel Corp. "FS eV2X RAT Selection Based on KPIs" 3GPP TSG-SA WGJ Meeting #75 S1-162355, Aug. 22, 2016 (Aug. 22, 2016) (2 page).

(Continued)

*Primary Examiner* — Thai D Hoang
(74) *Attorney, Agent, or Firm* — Perkins Coie LLP (57) ABSTRACT

A method for determining a sidelink type, a terminal device, and a network device are provided. The method comprises: receiving downlink control information (DCI) sent by a network device; determining, on the basis of the DCI, a first type of sidelink or a second type of sidelink as a target sidelink according to a preset rule, the first type of sidelink being different from the second type of sidelink in configuration parameters; and using the target sidelink to perform data transmission of the sidelink.

18 Claims, 4 Drawing Sheets

(58) Field of Classification Search
USPC ..... 370/315–326, 329–330, 335–346; 455/7, 455/11.1–23
See application file for complete search history.

(56) References Cited

U.S. PATENT DOCUMENTS

| | | | |
|---|---|---|---|
| 2017/0230956 A1* | 8/2017 | Kim | H04B 1/713 |
| 2017/0289733 A1 | 10/2017 | Rajagopal et al. | |
| 2017/0295601 A1* | 10/2017 | Kim | H04W 72/0406 |
| 2017/0366328 A1* | 12/2017 | Seo | H04L 5/0055 |
| 2018/0176891 A1* | 6/2018 | Kim | H04L 27/26 |
| 2018/0192397 A1* | 7/2018 | Seo | H04L 5/0044 |
| 2018/0317221 A1* | 11/2018 | Yasukawa | H04W 72/0413 |
| 2018/0367289 A1* | 12/2018 | Kim | H04L 5/0094 |
| 2018/0376474 A1* | 12/2018 | Khoryaev | H04W 76/14 |
| 2019/0075546 A1* | 3/2019 | Yasukawa | H04W 92/18 |
| 2019/0274121 A1* | 9/2019 | Wu | H04W 72/1284 |
| 2019/0363843 A1* | 11/2019 | Gordaychik | H04L 1/1854 |
| 2019/0386771 A1* | 12/2019 | Liu | H04L 5/0053 |
| 2020/0008225 A1* | 1/2020 | Lee | H04L 5/0053 |
| 2020/0107351 A1* | 4/2020 | Lee | H04L 5/0082 |
| 2020/0281009 A1* | 9/2020 | Lee | H04L 5/0007 |
| 2020/0288404 A1* | 9/2020 | Nory | H04L 5/0048 |
| 2020/0288444 A1* | 9/2020 | Cai | H04L 5/0037 |
| 2020/0336253 A1* | 10/2020 | He | H04L 1/0061 |
| 2020/0396760 A1* | 12/2020 | Yi | H04W 72/042 |
| 2021/0006376 A1* | 1/2021 | Cirik | H04L 5/0094 |
| 2021/0014831 A1* | 1/2021 | Ryu | H04W 76/11 |
| 2021/0022142 A1* | 1/2021 | Wu | H04W 76/11 |

FOREIGN PATENT DOCUMENTS

| | | |
|---|---|---|
| CN | 107979452 A | 5/2018 |
| EP | 3509379 A1 | 7/2019 |
| RU | 2510804 C2 | 4/2014 |
| WO | 2016034106 A1 | 3/2016 |
| WO | 2018044080 A1 | 3/2018 |
| WO | 2018048176 A1 | 3/2018 |

OTHER PUBLICATIONS

International Search Report dated Sep. 2, 2019 of PCT/CN2019/093706 (4 pages).
Samsung. "Solution for KI#2: PCS RAT Selection for a V2X Application" SA WG2 Meeting #127bis S2-185844, May 28, 2018 (May 28, 2018) (2 pages).
First Office Action for Chinese Application No. 202011200686.0 dated Sep. 26, 2021. 26 pages with English translation.
EPO, Extended European Search Report for European Patent Application No. 19826649.6, dated May 26, 2021. 10 pages.
Ericsson "Sidelink Resource Allocation in V2X" Tdoc R2-164105; 3GPP TSG-RAN WG2 #94; Nanjing, China; May 23-27, 2016. 5 pages.
Huawei et al. "DCI design for V2V" R1-166203; 3GPP TSG RAN WG1 Meeting #86; Gothenburg, Sweden; Aug. 22-26, 2016. 3 pages.
IPA, Examination Report No. 1 for Australian Patent Application No. 2019296431, dated Jul. 19, 2021. 4 pages.
Rospatent, Decision to Grant for Russian Patent Application No. 2020139775, dated May 24, 2021. 28 pages with English translation.
ZTE, "Scheduling of V2X SPS resources" R1-1609804; 3GPP TSG RAN WG1 Meeting #86bis; Lisbon, Portugal, Oct. 10-14, 2016. 4 pages.
Examination Report for Indian Application No. 202017050432 dated Dec. 13, 2021. 7 pages with English translation.
Examination Report No. 2 for Australian Application No. 2019296431 dated Dec. 25, 2021. 3 pages.
Notice of Reasons for Refusal for Japanese Application No. 2020-572472 dated Jan. 21, 2022. 12 pages with English translation.
Second Office Action for Chinese Application No. 202011200686.0 dated Dec. 14, 2021. 30 pages with English translation.
Extended European Search Report for European Application No. 22165879.2 dated Jun. 1, 2022. 11 pages.
Notice of Acceptance for Australian Application No. 2019296431 dated Mar. 29, 2022. 3 pages.

* cited by examiner

METHOD FOR DETERMINING SIDELINK CATEGORY, TERMINAL DEVICE, AND NETWORK DEVICE

CROSS-REFERENCE TO RELATED APPLICATIONS

This application is a continuation application of International PCT Application No. PCT/CN2019/093706 filed on Jun. 28, 2019, which claims the priority to Chinese patent application No. 201810701635.2 filed on Jun. 29, 2018, and the entire contents of both applications are hereby incorporated by reference.

TECHNICAL FIELD

The present disclosure relates to the field of communication, in particular to a method for determining a sidelink type, a terminal device and a network device.

BACKGROUND

A vehicle to everything (V2X) system is a Sidelink (SL) transmission technology based on Long Term Evolution (LTE)—Device to Device (D2D). Different from a mode in a conventional LTE system in which communication data are received or sent through a base station, V2X system uses a mode of terminal to terminal direct communication, and therefore has higher spectrum efficiency and lower transmission latency.

In Release 14 (Rel-14) of 3GPP, the vehicle to everything technology is standardized, and two transmission modes are defined: mode 3 and mode 4. In the mode 3, a transmission resource of a vehicle terminal is allocated by a base station. The vehicle terminal sends data on a sidelink according to the resource allocated by the base station. The base station may allocate, to the terminal, a resource for a single transmission or a resource for semi-static transmission.

In the vehicle to everything system, two types, LTE-V2X and NR-V2X, of sidelinks may exist at the same time. For the vehicle terminal, it is also possible to support these two kinds of sidelink structures at the same time, relatively. Compared with a sidelink of LTE-V2X type, in a sidelink architecture of NR-V2X type, automatic driving needs to be supported, so a higher requirement is put forward for data interaction between vehicles, such as a higher throughput, a lower latency, higher reliability, a larger coverage area, more flexible resource allocation, etc. In order to meet the above requirement, the sidelink of NR-V2X type may support a larger bandwidth, for example, it may reach tens of M-Hz (megahertz) or even a wider bandwidth. It is also possible to support a more flexible time slot structure, such as to support multiple kinds of subcarrier intervals (there is only one kind of subcarrier interval of 15 kHz on the sidelink of LTE-V2X).

When a transmission resource of the sidelink is scheduled by a network device, for example, in mode 3, it is impossible to distinguish whether a scheduling signaling sent by the network device is used for scheduling the sidelink of LTE-V2X type or NR-V2X type.

SUMMARY

Implementations of the present disclosure provide a method for determining a sidelink type, a terminal device and a network device.

In a first aspect, a method is provided, including: receiving Downlink Control Information (DCI) sent by a network device; determining that a first type of sidelink or a second type of sidelink is a target sidelink according to a preset rule and according to the DCI, wherein configuration parameters of the first type of sidelink and the second type of sidelink are different; and performing data transmission of sidelink using the target sidelink.

In a second aspect, a method is provided, including: sending Downlink Control Information (DCI) to a terminal device, wherein the DCI is used for the terminal device to determine that a first type of sidelink or a second type of sidelink is a target sidelink according to a preset rule, configuration parameters of the first type of sidelink and the second type of sidelink are different, and the target sidelink is used for the terminal device to perform data transmission of sidelink.

In a third aspect, a terminal device is provided, configured to perform the method in the above first aspect or each implementation thereof.

Specifically, the terminal device includes function modules for performing the method in the above first aspect or each implementation thereof.

In a fourth aspect, a network device is provided, configured to perform the method in the above second aspect or each implementation thereof.

Specifically, the network device includes function modules for performing the method in the above second aspect or each implementation thereof.

In a fifth aspect, a terminal device is provided, including a processor and a memory. The memory is configured to store a computer program, and the processor is configured to call and run the computer program stored in the memory to execute the method in the above first aspect or each implementation thereof.

In a sixth aspect, a network device is provided, including a processor and a memory. The memory is configured to store a computer program, and the processor is configured to call and run the computer program stored in the memory to execute the method in the above second aspect or each implementation thereof.

In a seventh aspect, a chip is provided, configured to implement the method in any one of the above first to second aspects or each implementation thereof.

Specifically, the chip includes a processor, configured to call and run a computer program from a memory, so that a device with which the chip is disposed performs the method in any one of the above first to second aspects or each implementation thereof.

In an eighth aspect, a computer readable storage medium is provided, configured to store a computer program, wherein the computer program causes a computer to perform the method in any one of the above first to second aspects or each implementation thereof.

In a ninth aspect, a computer program product is provided, including computer program instructions, wherein the computer program instructions cause a computer to perform the method in any one of the above first to second aspects or each implementation thereof.

In a tenth aspect, a computer program is provided, which, when being run on a computer, causes the computer to perform the method in any one of the above first to second aspects or each implementation thereof.

DETAILED DESCRIPTION

The technical solution in implementations of the present disclosure will be described below with reference to the drawings in implementations of the present disclosure. It is apparent that the implementations described are just a part of implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
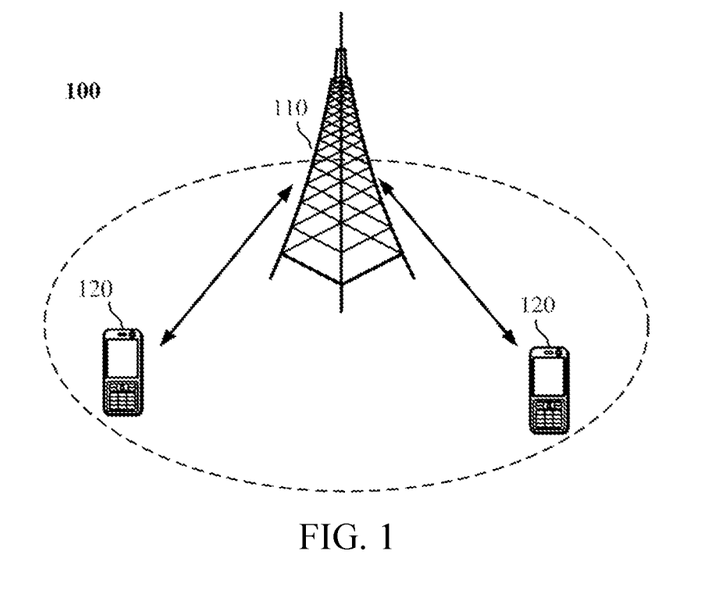
FIG. 1 is a schematic diagram of architecture of a communication system according to an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within a coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone; a Personal Communication System (PCS) terminal which may combine cellular radio telephone and data processing, faxing and data communication abilities; a PDA which may include a radio telephone, a pager, internet/intranet access, a Web browser, a memo pad, a calendar and/or a Global Positioning System (GPS) receiver; and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, terminal direct connection (Device to Device, D2D) communication may be performed between the terminal devices 120.

Optionally, the 5G system or the 5G network may also be referred to as a New Radio (NR) system or an NR network.

FIG. 1 exemplifies one network device and two terminal devices. Optionally, the communication system 100 may include multiple network devices, and another quantity of terminal devices may be included within a coverage area of each network device, which is not limited by implementations of the present disclosure.

Optionally, the communication system 100 may also include another network entity such as a network controller, a mobile management entity, etc., which is not limited by implementations of the present disclosure.

It should be understood that, a device with a communication function in a network/system in the implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The communication device may also include other devices in the communication system 100, such as other network entities such as network controllers, mobile management entities, etc., which is not limited by the implementation of the present disclosure.

In the implementation of the present disclosure, the network device 110 and the terminal device 120 in the communication system 100 shown in FIG. 1 belong to a vehicle to everything (V2X) system is taken as an example for illustration. V2X is a Sidelink (SL) transmission technology based on LTE-D2D, different from a traditional LTE system in which communication data are received or sent through a base station, the vehicle to everything system uses a mode of terminal-to-terminal direct communication, and therefore has a higher spectrum efficiency and a lower transmission latency.

Figure 2:
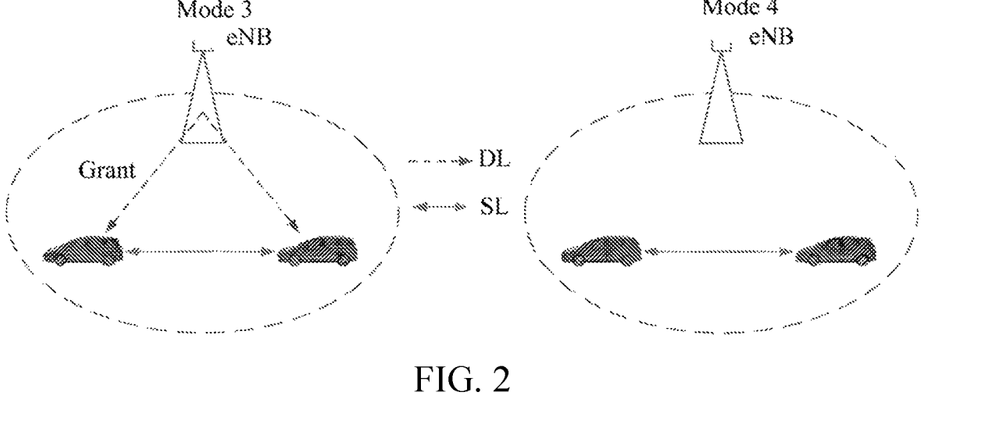
FIG. 2 is a schematic diagram of a transmission mode in a V2X system according to an implementation of the present disclosure.

In Release 14 (Rel-14) of 3GPP, the vehicle to everything technology is standardized, and two transmission modes as shown in FIG. 2 are defined: mode 3 and mode 4.

In the mode 3, a transmission resource of a vehicle terminal is allocated by a base station. The vehicle terminal sends data on a sidelink according to a resource allocated by the base station through a down link (DL); and the base station may allocate, to the terminal, a resource for a single transmission or a resource for semi-static transmission.

In the mode 4, a vehicle terminal uses a transmission mode of sensing plus reservation. The vehicle terminal acquires a set of available transmission resources in a resource pool by sensing, and the terminal randomly selects a resource from the set for data transmission. Since services in the V2X have a periodic characteristic, the terminal usually adopts a semi-static transmission mode, that is, after selecting a transmission resource, the terminal will continuously use the resource in multiple transmission periods, thus reducing probabilities of resource re-selection and resource conflict. The terminal will carry information of a resource reserved for next transmission in the control information of a current transmission, so that other terminals can determine whether a resource is reserved and used by the terminal by detecting the control information of the terminal, thus achieving a purpose of reducing resource conflicts.

In the vehicle to everything system, two types, LTE-V2X and NR-V2X, of sidelinks may exist at the same time. Compared with a sidelink of LTE-V2X type, in a sidelink architecture of NR-V2X type, automatic driving needs to be supported, so a higher requirement is put forward for data interaction between vehicles, such as a higher throughput, a lower latency, higher reliability, a larger coverage area, more flexible resource allocation, etc. In order to meet the above requirement, the sidelink of NR-V2X type may support a larger bandwidth, for example, it may reach tens of Mega-Hz or even a wider bandwidth; it is also possible to support a more flexible time slot structure, such as to support multiple subcarrier intervals (there is only one subcarrier interval of 15 kHz on the sidelink of LTE-V2X).

For the vehicle terminal, it is possible to support these two kinds of sidelink structures at the same time. When a transmission resource of the sidelink is scheduled by a network device, it is needed to distinguish whether a scheduling signaling sent by the network device is used for scheduling the sidelink of LTE-V2X type or NR-V2X type. Therefore, an implementation of the present disclosure provides a method for determining a sidelink type.

Figure 3:
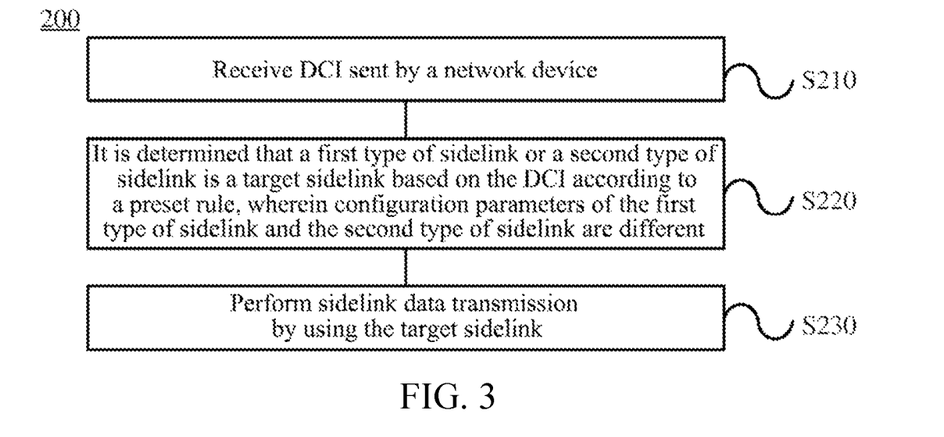
FIG. 3 is a schematic diagram of a method for determining a sidelink type according to an implementation of the present disclosure.

Specifically, FIG. 3 shows a schematic flow chart of a method 200 for determining a sidelink type according to an implementation of the present disclosure, and the method 200 may be performed by a terminal device. As shown in FIG. 3, the method 200 includes: S210, DCI sent by a network device is received; S220, it is determined that a first type of sidelink or a second type of sidelink is a target sidelink according to a preset rule and according to the DCI, wherein configuration parameters of the first type of sidelink and the second type of sidelink are different; and S230, data transmission of sidelink is performed using the target sidelink.

In the implementation of the present disclosure, the first type of sidelink and the second type of sidelink are different types of sidelinks, and configuration parameters of different types of sidelinks are different. Optionally, the configuration parameter may include bandwidth or subcarrier spacing. For example, a maximum bandwidth supported by the first type of sidelink is 20 MHz, and a maximum bandwidth supported by the second type of sidelink is 400 MHz; for another example, subcarrier spacing supported by the first type of sidelink only includes 15 k Hz, and the second type of sidelink supports more than one kind of subcarrier spacing, such as subcarrier spacing of 15 k Hz, 30 k Hz, 60 k Hz. Optionally, the configuration parameter may include a bandwidth part. For example, the configuration parameter of the second type of sidelink includes a bandwidth part parameter, while the configuration parameter of the first type of sidelink does not include the bandwidth part parameter. Optionally, the configuration parameter includes a carrier index. For example, the carrier index of the first type of sidelink is 1, and the carrier index of the second type of sidelink is 2. Optionally, the configuration parameter includes parameter information of sidelink feedback channel. For example, the second type of sidelink supports a sidelink feedback channel, and the configuration parameter includes the parameter information of sidelink feedback channel, while the first type of sidelink does not support a sidelink feedback channel, and the configuration parameter does not include the parameter information of sidelink feedback channel.

Optionally, the first type of sidelink and the second type of sidelink support different communication technologies. For example, the first type of sidelink may be a sidelink supporting an LTE system, and a corresponding second type of sidelink may be a sidelink supporting an NR system; or the first type of sidelink may be a sidelink supporting an NR system, and a corresponding second type of sidelink may be a sidelink supporting an LTE system. The configuration parameter of the sidelink supporting the LTE system and the configuration parameter of the sidelink supporting the NR system are different. For example, the sidelink supporting NR system may support a larger bandwidth, or has a more flexible time slot structure, such as supporting multiple kinds of subcarrier intervals, while subcarrier interval of the sidelink supporting the LTE system has only one kind, 15 kHz.

It should be understood that the terminal device may determine that the type of the target sidelink is the first type of sidelink or the second type of sidelink according to a preset rule and according to the received DCI, wherein the preset rule may be preconfigured, or the preset rule is configured by the network device, that is, the terminal device receives a preset rule sent by the network device, which is not limited by the implementation of the present disclosure, Optionally, as an implementation, the preset rule may include: the terminal device determines the type of the target sidelink according to a type field in the DCI. Specifically, the DCI may include a type field, wherein the type field is used for determining the type of the target sidelink. For example, a length of the type field may be one bit or more bits. The preset rule may include: if the type field is a first value, it is determined that the first type of sidelink is the target sidelink; and if the type field is a second value, it is determined that the second type of sidelink is the target sidelink.

For example, the type field may be 1 bit. If the type field is the first value, when the first value is 1, it is determined that the target sidelink is a sidelink supporting the LTE system; and if the type field is the second value, when the second value is 0, it is determined that the target sidelink is a sidelink supporting the NR system.

For another example, the type field may be more bits, e.g., 3 bits. If the type field is the first value, when the first value is 111, it is determined that the target sidelink is a sidelink supporting the LTE system; and if the type field is the second value, when the second value is 000, it is determined that the target sidelink is a sidelink supporting the NR system.

Optionally, as an implementation, the preset rule may include: the DCI includes an indication information field, and the terminal device determines the type of the target sidelink according to the indication information field. Specifically, if the indication information field indicates a first parameter set, the terminal device determines that the first type of sidelink is the target sidelink; and if the indication information field indicates a second parameter set, the terminal device determines that the second type of sidelink is the target sidelink. The indication information field may include K information fields. If values of the K information fields correspond to the first parameter set, it is determined that the target sidelink is a first type of sidelink, wherein the first type of sidelink is a sidelink supporting the LTE system; on the contrary, if the values of the K information fields correspond to the second parameter set, it is determined that the target sidelink is the second type of sidelink, wherein the second type of sidelink is a sidelink supporting the NR system. Herein, K is an integer greater than 1.

For example, the indication information field may include two information fields in DCI, wherein when a value of the first information field is a first parameter, a value of the second information field is a second parameter, and combination of the first parameter and the second parameter is a first parameter set, it is determined that the target sidelink is a sidelink supporting the LTE system; or, when a value of the first information field is a third parameter, a value of the second information field is a fourth parameter, and combination of the third parameter and the fourth parameter is a second parameter set, it is determined that the target sidelink is a sidelink supporting the NR system.

For example, the indication information may include Hybrid Automatic Repeat reQuest (HARQ) process indication information and Modulation and Coding Scheme (MCS) indication information in DCI, for example, the HARQ process indication information includes 4 bits, the MCS indication information includes 5 bits. When a value of the HARQ process indication information is 0000 and a value of the MCS indication information is 00000, combination of the values 0000 and 00000 is the first parameter set, and it is determined that the target sidelink is the sidelink supporting the LTE system; when the value of the HARQ process indication information is 1111 and the value of the MCS indication information is 11111, combination of the values 1111 and 11111 is the second parameter set, and it is determined that the target sidelink is the sidelink supporting the NR system.

It should be understood that a corresponding relationship between the value of the type field and the type of the target sidelink may be preset and configured; or configured by the network device; similarly, a corresponding relationship between the indication information field and the type of the target sidelink may also be preset and configured, or configured by the network device. For example, the network device sends configuration information to the terminal device, wherein the configuration information includes the corresponding relationship between the value of the type field and the type of the target sidelink.

Optionally, as an implementation, the preset rule may include: the type of the target sidelink is determined according to a Radio Network Temporary Identifier (RNTI) of scrambled DCI. Specifically, the preset rule may include: if the DCI is scrambled by using first RNTI, the first type of sidelink is used, that is, it is determined that the type of the target sidelink is the first type of sidelink; if the DCI is scrambled by using second RNTI, the second type of sidelink is used, that is, it is determined that the second type of sidelink is the target sidelink, wherein the second RNTI and the first RNTI are different.

For example, the first RNTI may be a sidelink vehicle RNTI (SL-V-RNTI), and correspondingly, the second RNTI is another RNTI except the SL-V-RNTI.

It should be understood that a corresponding relationship between the RNTI and the type of the target sidelink may be preset and configured; or configured by the network device. For example, the network device sends configuration information to the terminal device, wherein the configuration information includes a corresponding relationship between a value of RNTI and the type of the target sidelink, so that the terminal device determines, according to RNTI of scrambled DCI, that the type of the sidelink corresponding to the RNTI is the type of the target sidelink.

Optionally, as an implementation, the preset rule may include: the terminal device determines the type of the target sidelink according to a format of the DCI. Specifically, the terminal device determines that a format of received DCI is a first format or a second format, and the preset rule may include: if the DCI is the DCI in the first format, the first type of sidelink is scheduled, that is, it is determined that the first type of sidelink is the target sidelink; if the DCI is the DCI in the second format, the second type of sidelink is scheduled, that is, it is determined that the second type of sidelink is the target sidelink.

It should be understood that a corresponding relationship between the format of the DCI and the type of the target sidelink may be preset and configured; or configured by the network device. For example, the network device sends configuration information to the terminal device, wherein the configuration information includes the corresponding relationship between the format of the DCI and the type of the target sidelink.

Optionally, as an implementation, the preset rule may include: the type of the target sidelink is determined according to a search space bearing the DCI, for example, it is determined that the first type of sidelink or the second type of sidelink is the target sidelink according to the type of the search space bearing the DCI. Specifically, the preset rule may include: if the DCI is borne through a first type of search space, the first type of sidelink is scheduled, that is, it is determined that the first type of sidelink is the target sidelink; if the DCI is borne through a second type of search space, the second type of sidelink is scheduled, that is, it is determined that the second type of sidelink is the target sidelink. Herein, the search space bearing the DCI may be a common search space, or may be a dedicated search space of the terminal device. For example, if the DCI is sent in the common search space, then the first type of sidelink is scheduled, and if the DCI is sent in a UE-specific search space, the second type of sidelink is scheduled.

It should be understood that a corresponding relationship between a type of the search space bearing the DCI and the type of the target sidelink may be preset and configured; or configured by the network device. For example, the network device sends configuration information to the terminal device, wherein the configuration information includes the corresponding relationship between the type of the search space bearing the DCI and the type of the target sidelink.

Optionally, as an implementation, the preset rule may include: the type of the target sidelink is determined according to the search space bearing the DCI, for example, it is determined that the first type of sidelink or the second type of sidelink is the target sidelink according to an index of the search space bearing the DCI. Specifically, if the index of the search space bearing the DCI is a third value, the first type of sidelink is scheduled, that is, it is determined that the first type of sidelink is the target sidelink; if the index of the search space bearing the DCI is a fourth value, the second type of sidelink is scheduled, that is, it is determined that the second type of sidelink is the target sidelink.

For example, in the NR system, the network device may configure multiple search spaces for the terminal device. If the index of the search space bearing the DCI is the third value, for example, the third value is 0 or an even number, then the first type of sidelink is scheduled; if the index of the search space bearing the DCI is the fourth value, for example, the fourth value is 1 or an odd number, then the second type of sidelink is scheduled.

It should be understood that a corresponding relationship between the index of the search space bearing the DCI and the type of the target sidelink may be preset and configured; or configured by the network device. For example, the network device sends configuration information to the terminal device, wherein the configuration information includes the corresponding relationship between the index of the search space bearing the DCI and the type of the target sidelink.

Optionally, as an implementation, the preset rule may further include: the type of the target sidelink is determined according to a control resource set bearing the DCI. Specifically, the preset rule may include: if the DCI is borne through a first control resource set, the terminal device determines that the first type of sidelink is the target sidelink; if the DCI is borne through a second control resource set, the terminal device determines that the second type of sidelink is the target sidelink.

It should be understood that a corresponding relationship between the control resource set bearing the DCI and the type of the target sidelink may be preset and configured; or configured by the network device. For example, the network device sends configuration information to the terminal device, wherein the configuration information includes the corresponding relationship between the control resource set bearing the DCI and the type of the target sidelink.

Optionally, as an implementation, the preset rule may include: the type of the target sidelink is determined according to a carrier or a frequency band bearing the DCI. Specifically, in a downlink, a case in which coexistence of LTE and NR systems may exist, that is, the terminal device may support downlinks of LTE and NR at the same time, but carriers or frequency bands used by the LTE and NR systems are different. For example, a frequency band of the LTE system is at 2 GHz, while a frequency band of the NR system is at 3.4 GHz, and the network device may schedule a resource of a sidelink through an LTE carrier and/or an NR carrier. Correspondingly, the preset rule may include: if the carrier or the frequency band bearing the DCI is a first frequency, it is determined that the first type of sidelink is the target sidelink; if the carrier or the frequency band bearing the DCI is a second frequency, it is determined that the second type of sidelink is the target sidelink.

For example, the first frequency corresponds to an LTE carrier, that is, the DCI is sent on the LTE carrier, which may be used for scheduling the first type of sidelink, and the second frequency corresponds to an NR carrier, that is, the DCI is sent on the NR carrier, which may be used for scheduling the second type of sidelink.

It should be understood that a corresponding relationship between a type of a carrier or a frequency band bearing DCI and the type of the target sidelink may be preset and configured; or configured by the network device. For example, the network device sends configuration information to the terminal device, wherein the configuration information includes the corresponding relationship between the type of the carrier or the frequency band bearing the DCI and the type of the target sidelink.

Optionally, as an implementation, the preset rule may include: the type of the target sidelink is determined according to carrier indication information in the DCI. Specifically, the DCI may include carrier indication information, wherein the carrier indication information is used for indicating the terminal device to transmit data with another terminal device on a corresponding sidelink carrier. Similarly, according to the carrier indication information and a first corresponding relationship, the type of the target sidelink may also be determined, that is, the preset rule may include: it is determined that the first type of sidelink or the second type of sidelink is the target sidelink according to the carrier indication information and the first corresponding relationship, wherein the first corresponding relationship is used for indicating a corresponding relationship between the carrier indication information and the type of the target sidelink.

For example, the sidelink of the terminal device may include an LTE carrier and an NR carrier. The sidelink is transmitted using the LTE carrier, which means that it is determined that the type of the target sidelink is a sidelink supporting the LTE system, and the sidelink is transmitted using the NR carrier, which means that it is determined that the type of the target sidelink is a sidelink supporting the NR system. Furthermore, there is a corresponding relationship between the LTE carrier and the NR carrier, and a carrier index; and the carrier indication information of the DCI includes the carrier index, that is, there is also a corresponding relationship between the carrier indication information of the DCI and the target sidelink, that is, the first corresponding relationship. Optionally, the above corresponding relationship between the carrier and the carrier index, or the first corresponding relationship may be configured by the network device, or preconfigured, or reported by the terminal device to the network device.

For example, a sidelink of the terminal device supports two LTE carriers and four NR carriers, which respectively correspond to indexes being: 000 and 001 for the LTE carriers; and 100, 101, 110 and 111 for the NR carriers. The sidelink carrier used by the terminal device is determined according to index information carried in the carrier indication information in the DCI. For example, if the carrier indication information included in the DCI is 101, then the terminal device uses the NR carrier for data transmission of the sidelink, or it may also be determined that a type of the target sidelink of the terminal device is a sidelink supporting the NR system.

It should be understood that the method 200 may further include: the terminal device receives a preset rule sent by the network device, so that the terminal device determines the type of the target sidelink according to the preset rule. For example, the terminal device receives a preset rule sent by the network device, wherein the preset rule may be determining the type of the target sidelink according to the type of the search space bearing the DCI. Then the terminal device determines the type of the target sidelink according to a corresponding relationship between the type of the search space bearing the DCI and the type of the target sidelink, which is preconfigured, or configured by the network device.

Therefore, in the method for determining a sidelink type according to the implementation of the present disclosure, for under a case in which a network device schedules a sidelink transmission resource for a terminal device, a sidelink type is determined according to DCI sent by the network device and according to a preset rule, for example, the sidelink type is indicated by a mode such as a type of a carrier bearing the DCI, a search space type, a DCI format, RNTI of scrambled DCI, etc., so that the terminal device may determine whether the network device schedules LTE-V2X or NR-V2X, which increases flexibility of system resource scheduling.

With reference to FIG. 3, the method for determining a sidelink type according to the implementation of the present disclosure is described in detail above from a perspective of a terminal device, and with reference to FIG. 4, a method for determining a sidelink type according to an implementation of the present disclosure will be described below from a perspective of a network device.

Figure 4:
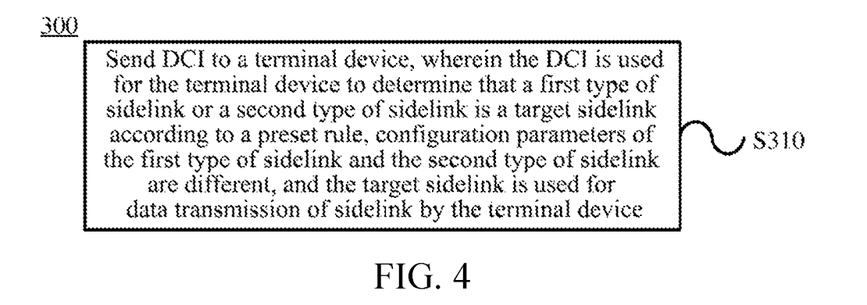
FIG. 4 is another schematic diagram of a method for determining a sidelink type according to an implementation of the present disclosure.

FIG. 4 shows a schematic flow chart of a method 300 for determining a sidelink type according to an implementation of the present disclosure, wherein the method 300 may be performed by a network device. Specifically, for example, the network device may be the network device 110 shown in FIG. 1, or may be the network device eNB shown in FIG. 2. As shown in FIG. 4, the method 300 includes: S310, Downlink Control Information (DCI) is sent to a terminal device, wherein the DCI is used for the terminal device to determine that a first type of sidelink or a second type of sidelink is a target sidelink according to a preset rule, configuration parameters of the first type of sidelink and the second type of sidelink are different, and the target sidelink is used for data transmission of sidelink by the terminal device.

Optionally, the method 300 further includes: the preset rule is sent to the terminal device.

Optionally, the preset rule includes: the DCI includes a type field, if the type field is a first value, the DCI is used for indicating the terminal device to determine that the first type of sidelink is the target sidelink; if the type field is a second value, the DCI is used for indicating the terminal device to determine that the second type of sidelink is the target sidelink.

Optionally, the preset rule includes: if the DCI is scrambled by using a first RNTI, the DCI is used for indicating the terminal device to determine that the first type of sidelink is the target sidelink; if the DCI is scrambled by using a second RNTI, the DCI is used for indicating the terminal device to determine that the second type of sidelink is the target sidelink, wherein the second RNTI and the first RNTI are different.

Optionally, the first RNTI is a SideLink Vehicle Radio Network Temporary Identifier (SL-V-RNTI).

Optionally, the preset rule includes: if the DCI is DCI in a first format, the DCI is used for indicating the terminal device to determine that the first type of sidelink is the target sidelink; if the DCI is DCI in a second format, the DCI is used for indicating the terminal device to determine that the second type of sidelink is the target sidelink.

Optionally, the preset rule includes: the DCI is used for indicating the terminal device to determine that the first type of sidelink or the second type of sidelink is the target sidelink according to a search space bearing the DCI or a control resource set.

Optionally, the preset rule includes: if the DCI is borne through a first type of search space, the DCI is used for indicating the terminal device to determine that the first type of sidelink is the target sidelink; if the DCI is borne through a second type of search space, the DCI is used for indicating the terminal device to determine that the second type of sidelink is the target sidelink.

Optionally, the preset rule includes: if the DCI is borne through a first control resource set, the DCI is used for indicating the terminal device to determine that the first type of sidelink is the target sidelink; if the DCI is borne through a second control resource set, the DCI is used for indicating the terminal device to determine that the second type of sidelink is the target sidelink.

Optionally, the preset rule includes: if an index of the search space bearing the DCI is a third value, the DCI is used for indicating the terminal device to determine that the first type of sidelink is the target sidelink; if an index of the search space bearing the DCI is a fourth value, the DCI is used for indicating the terminal device to determine that the second type of sidelink is the target sidelink.

Optionally, the preset rule includes: if a carrier or a frequency band bearing the DCI is a first frequency, the DCI is used for indicating the terminal device to determine that the first type of sidelink is the target sidelink; if the carrier or the frequency band bearing the DCI is a second frequency, the DCI is used for indicating the terminal device to determine that the second type of sidelink is the target sidelink.

Optionally, the preset rule includes: the DCI includes carrier indication information, and it is determined that the first type of sidelink or the second type of sidelink is the target sidelink according to the carrier indication information and a first corresponding relationship, wherein the first corresponding relationship is used for indicating a corresponding relationship between the carrier indication information and a type of the target sidelink.

Optionally, the first corresponding relationship is preconfigured.

Optionally, the method 300 further includes: the first corresponding relationship is sent to the terminal device; or, the first corresponding relationship sent by the terminal device is received.

Optionally, the first type of sidelink is a sidelink supporting the LTE system, and the second type of sidelink is a sidelink supporting the NR system; or the first type of sidelink is a sidelink supporting the NR system, and the second type of sidelink is a sidelink supporting the LTE system.

Therefore, in the method for determining a sidelink type according to the implementation of the present disclosure, for under a case in which a network device schedules a sidelink transmission resource for a terminal device, the network device sends DCI to the terminal device, so that the terminal device determines a sidelink type according to the DCI and according to a preset rule, for example, the sidelink type is indicated by a mode such as a type of a carrier bearing the DCI, a search space type, a DCI format, RNTI of scrambled DCI, etc., so that the terminal device may determine whether the network device schedules LTE-V2X or NR-V2X, which increases flexibility of system resource scheduling.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

In addition, the terms "system" and "network" are often used interchangeably herein. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

The method for determining a sidelink type according to the implementation of the present disclosure is described in detail above with reference to FIG. 1 to FIG. 4. A terminal device and a network device according to an implementation of the present disclosure will be described below with reference to FIG. 5 to FIG. 9.

Figure 5:
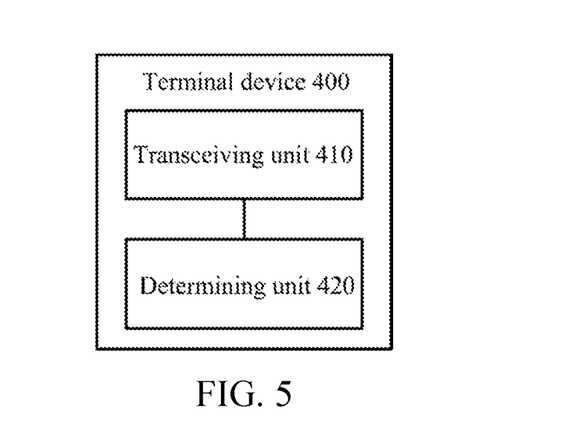
FIG. 5 is a schematic block diagram of a terminal device according to an implementation of the present disclosure.

As shown in FIG. 5, a terminal device 400 according to an implementation of the present disclosure includes a transceiving unit 410 and determination unit 420. Specifically, the transceiving unit 410 is configured to receive Downlink Control Information (DCI) sent by a network device; the determining unit 420 is configured to determine that a first type of sidelink or a second type of sidelink is a target sidelink according to the DCI and according to a preset rule, wherein configuration parameters of the first type of sidelink and the second type of sidelink are different; and the transceiving unit 410 is further configured to perform data transmission of sidelink using the target sidelink.

Optionally, the preset rule includes: the DCI includes a type field, if the type field is a first value, it is determined that the first type of sidelink is the target sidelink; and if the type field is a second value, it is determined that the second type of sidelink is the target sidelink.

Optionally, the preset rule includes: the DCI includes an indication information field, if the indication information field indicates a first parameter set, it is determined that the first type of sidelink is the target sidelink; and if the indication information field indicates a second parameter set, it is determined that the second type of sidelink is the target sidelink.

Optionally, the preset rule includes: if the DCI is scrambled by using a first Radio Network Temporary Identifier (RNTI), it is determined that the first type of sidelink is the target sidelink; if the DCI is scrambled by using a second RNTI, it is determined that the second type of sidelink is the target sidelink, wherein the second RNTI and the first RNTI are different.

Optionally, the first RNTI is SL-V-RNTI.

Optionally, the preset rule includes: if the DCI is DCI in a first format, it is determined that the first type of sidelink is the target sidelink; if the DCI is DCI in a second format, it is determined that the second type of sidelink is the target sidelink.

Optionally, the preset rule includes: it is determined that the first type of sidelink or the second type of sidelink is the target sidelink according to a search space bearing the DCI or a control resource set.

Optionally, it is determined that the first type of sidelink or the second type of sidelink is the target sidelink according to the search space bearing the DCI in the preset rule, including: if the DCI is borne through a first type of search space, it is determined that the first type of sidelink is the target sidelink; if the DCI is borne through a second type of search space, it is determined that the second type of sidelink is the target sidelink.

Optionally, it is determined that the first type of sidelink or the second type of sidelink is the target sidelink according to the search space bearing the DCI in the preset rule, including: if an index of the search space bearing the DCI is a third value, it is determined that the first type of sidelink is the target sidelink; if an index of the search space bearing the DCI is a fourth value, it is determined that the second type of sidelink is the target sidelink.

Optionally, the preset rule includes: if the DCI is borne through a first control resource set, it is determined that the first type of sidelink is the target sidelink; if the DCI is borne through a second control resource set, it is determined that the second type of sidelink is the target sidelink.

Optionally, the preset rule includes: if a carrier or a frequency band bearing the DCI is a first frequency, it is determined that the first type of sidelink is the target sidelink; if the carrier or the frequency band bearing the DCI is a second frequency, it is determined that the second type of sidelink is the target sidelink.

Optionally, the preset rule includes: the DCI includes carrier indication information, and it is determined that the first type of sidelink or the second type of sidelink is the target sidelink according to the carrier indication information and a first corresponding relationship, wherein the first corresponding relationship is used for indicating a corresponding relationship between the carrier indication information and the type of the target sidelink.

Optionally, the first corresponding relationship is preconfigured, or configured by the network device.

Optionally, the transceiving unit 410 is further configured to: send the first corresponding relationship to the network device.

Optionally, the first type of sidelink is a sidelink supporting the LTE system, and the second type of sidelink is a sidelink supporting the NR system; or the first type of sidelink is a sidelink supporting the NR system, and the second type of sidelink is a sidelink supporting the LTE system.

Optionally, the transceiving unit 410 is further configured to: receive the preset rule sent by the network device.

Optionally, the configuration parameters of the first type of sidelink and the second type of sidelink are different, including at least one of following cases: a maximum bandwidth supported by the first type of sidelink and a maximum bandwidth supported by the second type of sidelink are different; a subcarrier spacing size supported by the first type of sidelink and a subcarrier spacing size supported by the second type of sidelink are different; a class of subcarrier spacing supported by the first type of sidelink and a class of subcarrier spacing supported by the second type of sidelink are different; the configuration parameter of the first type of sidelink does not include a bandwidth part, and the configuration parameter of the second type of sidelink includes a bandwidth part; a carrier index of the first type of sidelink and a carrier index of the second type of sidelink are different; the configuration parameter of the first type of sidelink does not include parameter information of a sidelink feedback channel, and the configuration parameter of the second type of sidelink includes the parameter information of the sidelink feedback channel.

It should be understood that the terminal device 400 according to the implementation of the present disclosure may correspondingly perform the method 200 in the implementation of the present disclosure, and the above and other operations and/or functions of various units in the terminal device 400 are respectively for realizing corresponding processes of the terminal device in the various methods in FIG. 1 to FIG. 4, which will not be repeated here for the sake of brevity.

Therefore, the terminal device according to the implementation of the present disclosure receives, under a case in which a network device schedules a sidelink transmission resource for a terminal device, DCI sent by the network device, determines a sidelink type according to a preset rule, for example, the sidelink type is indicated by a mode such as a type of a carrier bearing the DCI, a search space type, a DCI format, RNTI of scrambled DCI, etc., so that the terminal device may determine whether the network device schedules LTE-V2X or NR-V2X, which increases flexibility of system resource scheduling.

Figure 6:
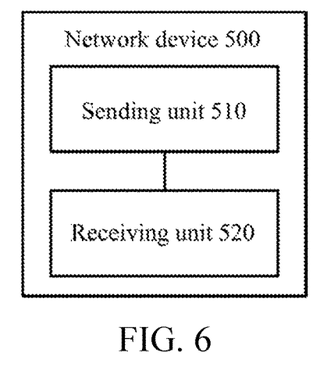
FIG. 6 is a schematic block diagram of a network device according to an implementation of the present disclosure.

As shown in FIG. 6, a network device 500 according to an implementation of the present disclosure includes a sending unit 510, and optionally, may further include a receiving unit 520. Specifically, the sending unit 510 is configured to send Downlink Control Information (DCI) to a terminal device, wherein the DCI is used for the terminal device to determine that a first type of sidelink or a second type of sidelink is a target sidelink according to a preset rule, configuration parameters of the first type of sidelink and the second type of sidelink are different, and the target sidelink is used for data transmission of sidelink by the terminal device.

Optionally, the sending unit 510 is further configured to send the preset rule to the terminal device.

Optionally, the preset rule includes: the DCI includes a type field, if the type field is a first value, the DCI is used for indicating the terminal device to determine that the first type of sidelink is the target sidelink; if the type field is a second value, the DCI is used for indicating the terminal device to determine that the second type of sidelink is the target sidelink.

Optionally, the preset rule includes: the DCI includes an indication information field, if the indication information field indicates a first parameter set, the DCI is used for indicating that the first type of sidelink is the target sidelink; and if the indication information field indicates a second parameter set, the DCI is used for indicating that the second type of sidelink is the target sidelink.

Optionally, the preset rule includes: if the DCI is scrambled by using a first Radio Network Temporary Identifier (RNTI), the DCI is used for indicating the terminal device to determine that the first type of sidelink is the target sidelink; if the DCI is scrambled by using a second RNTI, the DCI is used for indicating the terminal device to determine that the second type of sidelink is the target sidelink, wherein the second RNTI and the first RNTI are different.

Optionally, the first RNTI is SL-V-RNTI.

Optionally, the preset rule includes: if the DCI is DCI in a first format, the DCI is used for indicating the terminal device to determine that the first type of sidelink is the target sidelink; if the DCI is DCI in a second format, the DCI is used for indicating the terminal device to determine that the second type of sidelink is the target sidelink.

Optionally, the preset rule is used for indicating the terminal device to determine that the first type of sidelink or the second type of sidelink is the target sidelink according to a search space bearing the DCI or a control resource set.

Optionally, the preset rule includes: if the DCI is borne through a first type of search space, the DCI is used for indicating the terminal device to determine that the first type of sidelink is the target sidelink; if the DCI is borne through a second type of search space, the DCI is used for indicating the terminal device to determine that the second type of sidelink is the target sidelink.

Optionally, the preset rule includes: if an index of the search space bearing the DCI is a third value, the DCI is used for indicating the terminal device to determine that the first type of sidelink is the target sidelink; if an index of the search space bearing the DCI is a fourth value, the DCI is used for indicating the terminal device to determine that the second type of sidelink is the target sidelink.

Optionally, the preset rule includes: if the DCI is borne through a first control resource set, the DCI is used for indicating the terminal device to determine that the first type of sidelink is the target sidelink; if the DCI is borne through a second control resource set, the DCI is used for indicating the terminal device to determine that the second type of sidelink is the target sidelink.

Optionally, the preset rule includes: if a carrier or a frequency band bearing the DCI is a first frequency, the DCI is used for indicating the terminal device to determine that the first type of sidelink is the target sidelink; if the carrier or the frequency band bearing the DCI is a second frequency, the DCI is used for indicating the terminal device to determine that the second type of sidelink is the target sidelink.

Optionally, the preset rule includes: the DCI includes carrier indication information, and it is determined that the first type of sidelink or the second type of sidelink is the target sidelink according to the carrier indication information and a first corresponding relationship, wherein the first corresponding relationship is used for indicating a corresponding relationship between the carrier indication information and a type of the target sidelink.

Optionally, the first corresponding relationship is preconfigured.

Optionally, the sending unit 510 is further configured to send the first corresponding relationship to the terminal device.

Optionally, the receiving unit 520 is further configured to receive the first corresponding relationship sent by the terminal device.

Optionally, the first type of sidelink is a sidelink supporting the LTE system, and the second type of sidelink is a sidelink supporting the NR system; or the first type of sidelink is a sidelink supporting the NR system, and the second type of sidelink is a sidelink supporting the LTE system.

Optionally, the configuration parameters of the first type of sidelink and the second type of sidelink are different, including at least one of following cases: a maximum bandwidth supported by the first type of sidelink and a maximum bandwidth supported by the second type of sidelink are different; a subcarrier spacing size supported by the first type of sidelink and a subcarrier spacing size supported by the second type of sidelink are different; a class of subcarrier spacing supported by the first type of sidelink and a class of subcarrier spacing supported by the the second type of sidelink are different; the configuration parameter of the first type of sidelink does not include a bandwidth part, and the configuration parameter of the second type of sidelink includes a bandwidth part; a carrier index of the first type of sidelink and a carrier index of the second type of sidelink are different; the configuration parameter of the first type of sidelink does not include parameter information of a sidelink feedback channel, and the configuration parameter of the second type of sidelink includes the parameter information of the sidelink feedback channel.

It should be understood that the network device 500 according to the implementation of the present disclosure may correspondingly perform the method 300 in the implementation of the present disclosure, and the above and other operations and/or functions of various units in the network device 500 are respectively for realizing corresponding processes of the network device in the various methods in FIGS. 1 to 4, which will not be repeated here for the sake of brevity.

Figure 7:
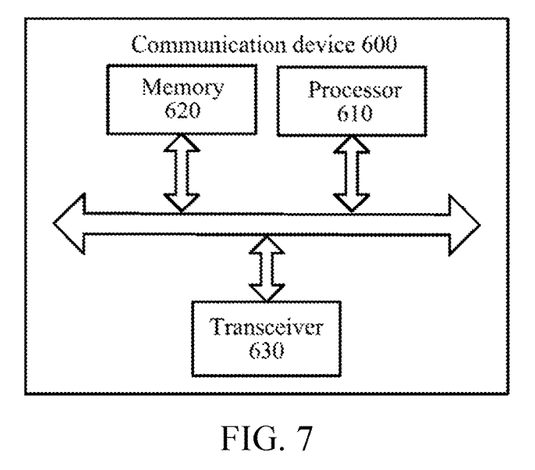
FIG. 7 is a schematic block diagram of a communication device according to an implementation of the present disclosure.

Therefore, a network device according to the implementation of the present disclosure sends, under a case in which a sidelink transmission resource is scheduled for a terminal device, DCI to the terminal device, so that the terminal device determines a sidelink type according to the DCI and according to a preset rule, for example, the sidelink type is indicated by a mode such as a type of a carrier bearing the DCI, a search space type, a DCI format, RNTI of scrambled DCI, etc., so that the terminal device may determine whether the network device schedules LTE-V2X or NR-V2X, which increases flexibility of system resource scheduling. FIG. 7 is a schematic block diagram of a communication device 600 according to an implementation of the present disclosure. A communication device 600 shown in FIG. 7 includes a processor 610. The processor 610 may call and run a computer program from a memory to implement the method in the implementation of the present disclosure.

Optionally, as shown in FIG. 7, the communication device 600 may further include a memory 620. Herein, the processor 610 may call and run a computer program from the memory 620 to implement the method in the implementation of the present disclosure.

The memory 620 may be a separate device independent of the processor 610 or may be integrated in the processor 610.

Optionally, as shown in FIG. 7, the communication device 600 may further include a transceiver 630, and the processor 610 may control the transceiver 630 to communicate with another device. Specifically, information or data may be sent to another device, or information or data sent by another device is received.

Herein, the transceiver 630 may include a transmitter and a receiver. The transceiver 630 may also further include an antenna, and a quantity of the antenna may be one or more.

Optionally, the communication device 600 may specifically be a network device of the implementation of the present disclosure, and the communication device 600 may implement corresponding processes implemented by the network device in various methods of the implementation of the present disclosure, which will not be repeated here for brevity.

Optionally, the communication device 600 may be specifically a mobile terminal/terminal device of the implementation of the present disclosure, and the communication device 600 may implement corresponding processes implemented by the mobile terminal/terminal device in various methods of the implementation of the present disclosure, which will not be repeated here for brevity.

Figure 8:
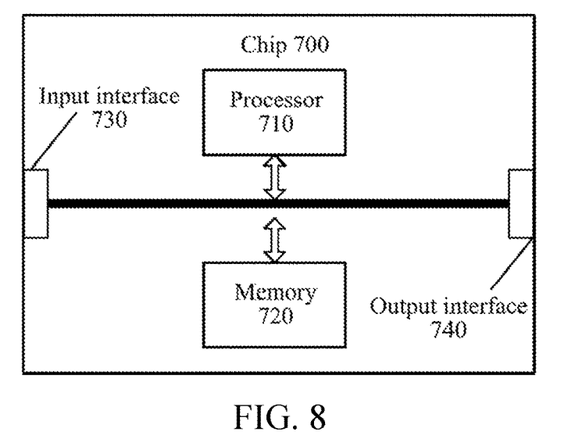
FIG. 8 is a schematic block diagram of a chip according to an implementation of the present disclosure.

FIG. 8 is a schematic diagram of a structure of a chip of an implementation of the present disclosure. A chip 700 shown in FIG. 8 includes a processor 710. The processor 710 may call and run a computer program from a memory to implement the method in the implementation of the present disclosure.

Optionally, as shown in FIG. 8, the chip 700 may further include a memory 720. Herein, the processor 710 may call and run a computer program from the memory 720 to implement the method in the implementation of the present disclosure.

Herein, the memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. Herein, the processor 710 may control the output interface 740 to communicate with another device or chip, and specifically, information or data may be output to another device or chip.

Optionally, the chip may be applied in a network device of the implementation of the present disclosure, and the chip may implement corresponding processes implemented by the network device in various methods of the implementation of the present disclosure, which will not be repeated here for brevity.

Optionally, the chip may be applied in a mobile terminal/terminal device of the implementation of the present disclosure, and the chip may implement corresponding processes implemented by the mobile terminal/terminal device in various methods of the implementation of the present disclosure, which will not be repeated here for brevity.

It should be understood that the chip mentioned in the implementation of the present disclosure may also be referred to as a system-level chip, a system chip, a chip system or a system chip on a chip, etc.

Figure 9:
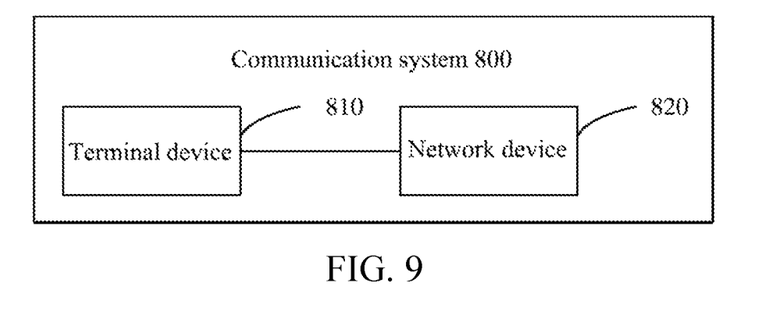
FIG. 9 is a schematic block diagram of a communication system according to an implementation of the present disclosure.

FIG. 9 is a schematic block diagram of a communication system 800 provided by an implementation of the present disclosure. As shown in FIG. 9, the communication system 800 includes a terminal device 810 and a network device 820.

Herein, the terminal device 810 may be configured to implement the corresponding functions implemented by the terminal device in the above method, and the network device 820 may be configured to implement the corresponding functions implemented by the network device in the above method, which will not be repeated here for brevity.

It should be understood that, the processor in this implementation of the present disclosure may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in this implementation of the present disclosure. The general purpose processor may be a microprocessor, or the processor may be any conventional processor or the like. The steps of the method disclosed with reference to this implementation of this application may be directly implemented by a hardware decoding processor, or may be implemented by a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that, the memory in this implementation of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied in a network device of the implementation of the present disclosure, and the computer program causes a computer to perform corresponding processes implemented by the network device in various methods of the implementations of the present disclosure, which will not be repeated here for brevity.

Optionally, the computer readable storage medium may be applied in a mobile terminal/terminal device of the implementation of the present disclosure, and the computer program causes a computer to perform corresponding flows implemented by the mobile terminal/terminal device in various methods of the implementations of the present disclosure, which will not be repeated here for brevity.

An implementation of the present disclosure also provides a computer program product including computer program instructions.

Optionally, the computer program product may be applied in a network device of the implementation of the present disclosure, and the computer program instructions cause a computer to perform corresponding processes implemented by the network device in various methods of the implementation of the present disclosure, which will not be repeated here for brevity.

Optionally, the computer program product may be applied in a mobile terminal/terminal device of the implementation of the present disclosure, and the computer program instructions cause a computer to perform corresponding flows implemented by the mobile terminal/terminal device in various methods according to the implementation of the present disclosure, which will not be repeated here for brevity.

An implementation of the present disclosure also provides a computer program.

Optionally, the computer program may be applied in a network device of the implementation of the present disclosure. When the computer program is run on a computer, the computer is caused to perform corresponding processes implemented by the network device in various methods of the implementations of the present disclosure, which will not be repeated here for brevity.

Optionally, the computer program may be applied in a mobile terminal/terminal device of the implementation of the present disclosure. When the computer program is run on a computer, the computer is caused to perform corresponding processes implemented by the mobile terminal/terminal device in various methods of the implementation of the present disclosure, which will not be repeated here for brevity.

Those of ordinary skill in the art will recognize that the exemplary units and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Part or all of the units therein may be selected according to an actual requirement to achieve a purpose of solutions of the present implementations.

In addition, various functional units in various implementations of the present disclosure may be integrated in one processing unit, or various units may be physically present separately, or two or more units may be integrated in one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in the implementations of the present disclosure. The foregoing storage medium includes: any medium that may store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be determined by the protection scope of the claims.

What is claimed is:

1. A method for sidelink data transmission, comprising:
receiving Downlink Control Information (DCI);
determining a format of the DCI;
when the DCI is a DCI in a first format, the DCI is used for scheduling a first type of sidelink;
when the DCI is a DCI in a second format, the DCI is used for scheduling a second type of sidelink;
wherein configuration parameters of the first type of sidelink and the second type of sidelink are different,
wherein the configuration parameter of the second type of sidelink comprises a bandwidth part that is not in the configuration parameter of the first type of sidelink, and
wherein the configuration parameter of the second type of sidelink comprises parameter information of a sidelink feedback channel that is not in the configuration parameter of the first type of sidelink; and
transmitting sidelink data transmission by using the scheduled sidelink.

2. The method according to claim 1, wherein
when the DCI is the DCI in the first format, the DCI is scrambled by using a first Radio Network Temporary Identifier (RNTI); and
when the DCI is the DCI in the second format, the DCI is scrambled by using a second RNTI, wherein the second RNTI is different from the first RNTI.

3. The method according to claim 1, wherein,
the first type of sidelink is a sidelink supporting a Long Term Evolution (LTE) system, and the second type of sidelink is a sidelink supporting a New Radio (NR) system; or the first type of sidelink is a sidelink supporting an NR system, and the second type of sidelink is a sidelink supporting a LTE system.

4. The method according to claim 1, wherein the configuration parameters of the first type of sidelink and the second type of sidelink being different comprises at least one of following cases:
a maximum bandwidth supported by the first type of sidelink is different from a maximum bandwidth supported by the second type of sidelink;
a subcarrier spacing size supported by the first type of sidelink is different from a subcarrier spacing size supported by the second type of sidelink;
a class of subcarrier spacing supported by the first type of sidelink is different from a class of subcarrier spacing supported by the second type of sidelink;
a carrier index of the first type of sidelink is different from a carrier index of the second type of sidelink.

5. The method according to claim 1, wherein
the DCI in the first format is carried by a carrier or a frequency band with a first frequency; and
the DCI in the second format is carried by a carrier or a frequency band with a second frequency.

6. The method according to claim 1, wherein the method further comprises that:
the DCI comprises an indication information field,
when the indication information field indicates a first parameter set, the first type of sidelink is scheduled to be used for transmitting sidelink data; and
when the indication information field indicates a second parameter set, the second type of sidelink is scheduled to be used for transmitting sidelink data.

7. The method according to claim 1, wherein the format of the DCI is determined according to a preset rule, the preset rule comprises that:
the DCI comprises an indication information field,
if the indication information field indicates a first parameter set, the DCI is determined to be in the first format; and
if the indication information field indicates a second parameter set, the DCI is determined to be in the second format.

8. The method according to claim 1, wherein the format of the DCI is determined according to a preset rule, the preset rule comprises that:
the DCI comprises carrier indication information, and
the DCI is determined to be in the first format or in the second format according to the carrier indication information and a first corresponding relationship, wherein the first corresponding relationship is configured for indicating a corresponding relationship between the carrier indication information and a format of the DCI.

9. A terminal device, comprising: a processor, a memory, and a transceiver, wherein the memory is configured to store computer program, the transceiver is configured to communicate with another device, and the processor is configured to implement the computer program in the memory to:
control the transceiver to receive Downlink Control Information (DCI);
determine a format of the DCI;
when the DCI is a DCI in a first format, the DCI is used for scheduling a first type of sidelink;
when the DCI is a DCI in a second format, the DCI is used for scheduling a second type of sidelink;
wherein configuration parameters of the first type of sidelink and the second type of sidelink are different, wherein the configuration parameter of the second type of sidelink comprises a bandwidth part that is not in the configuration parameter of the first type of sidelink, and wherein the configuration parameter of the second type of sidelink comprises parameter information of a sidelink feedback channel that is not in the configuration parameter of the first second type of sidelink; and control the transceiver to transmit sidelink data transmission by using the scheduled sidelink.

10. The terminal device according to claim 9, wherein when the DCI is the DCI in the first format, the DCI is scrambled by using a first Radio Network Temporary Identifier (RNTI); and when the DCI is the DCI in the second format, the DCI is scrambled by using a second RNTI, wherein the second RNTI is different from the first RNTI.

11. The terminal device according to claim 9, wherein, the first type of sidelink is a sidelink supporting a Long Term Evolution (LTE) system, and the second type of sidelink is a sidelink supporting a New Radio (NR) system; or the first type of sidelink is a sidelink supporting an NR system, and the second type of sidelink is a sidelink supporting a LTE system.

12. The terminal device according to claim 9, wherein the configuration parameters of the first type of sidelink and the second type of sidelink being different comprises at least one of following cases:

a maximum bandwidth supported by the first type of sidelink is different from a maximum bandwidth supported by the second type of sidelink;

a subcarrier spacing size supported by the first type of sidelink is different from a subcarrier spacing size supported by the second type of sidelink;

a class of subcarrier spacing supported by the first type of sidelink is different from a class of subcarrier spacing supported by the second type of sidelink;

a carrier index of the first type of sidelink is different from a carrier index of the second type of sidelink.

13. The terminal device according to claim 9, wherein the DCI in the first format is carried by a carrier or a frequency band with a first frequency; and the DCI in the second format is carried by a carrier or a frequency band with a second frequency.

14. The terminal device according to claim 9, wherein the DCI comprises an indication information field, when the indication information field indicates a first parameter set, the first type of sidelink is scheduled to be used for transmitting sidelink data; and when the indication information field indicates a second parameter set, the second type of sidelink is scheduled to be used for transmitting sidelink data.

15. The terminal device according to claim 9, wherein the format of the DCI is determined according to a preset rule, the preset rule comprises that:

the DCI comprises an indication information field, if the indication information field indicates a first parameter set, the DCI is determined to be in the first format; and if the indication information field indicates a second parameter set, the DCI is determined to be in the second format.

16. The terminal device according to claim 9, wherein the format of the DCI is determined according to a preset rule, the preset rule comprises that:

the DCI comprises carrier indication information, and the DCI is determined to be in the first format or in the second format according to the carrier indication information and a first corresponding relationship, wherein the first corresponding relationship is configured for indicating a corresponding relationship between the carrier indication information and a format of the DCI.

17. A chip, comprising:

a memory configured to store a computer program; and a processor configured to call and run the computer program from the memory, so that a device disposed with the chip is caused to:

receive Downlink Control Information (DCI);

determine a format of the DCI;

when the DCI is a DCI in a first format, the DCI is used for scheduling a first type of sidelink;

when the DCI is a DCI in a second format, the DCI is used for scheduling a second type of sidelink;

wherein configuration parameters of the first type of sidelink and the second type of sidelink are different, wherein the configuration parameter of the second type of sidelink comprises a bandwidth part that is not in the configuration parameter of the first type of sidelink, and wherein the configuration parameter of the second type of sidelink comprises parameter information of a sidelink feedback channel that is not in the configuration parameter of the first type of sidelink; and transmit sidelink data transmission by using the scheduled sidelink.

18. A non-transitory computer readable storage medium, configured to store a computer program, wherein the computer program causes a computer to;

receive Downlink Control Information (PCI);

determine a format of the PCI;

when the PCI is a PCI in a first format, the PCI is used for scheduling a first type of sidelink;

when the PCI is a PCI in a second format, the PCI is used for scheduling a second type of sidelink;

wherein configuration parameters of the first type of sidelink and the second type of sidelink are different, wherein the configuration parameter of the second type of sidelink comprises a bandwidth part that is not in the configuration parameter of the first type of sidelink, and wherein the configuration parameter of the second type of sidelink comprises parameter information of a sidelink feedback channel that is not in the configuration parameter of the second type of sidelink; and transmit sidelink data transmission by using the scheduled sidelink.

* * * * *